Figure 1:
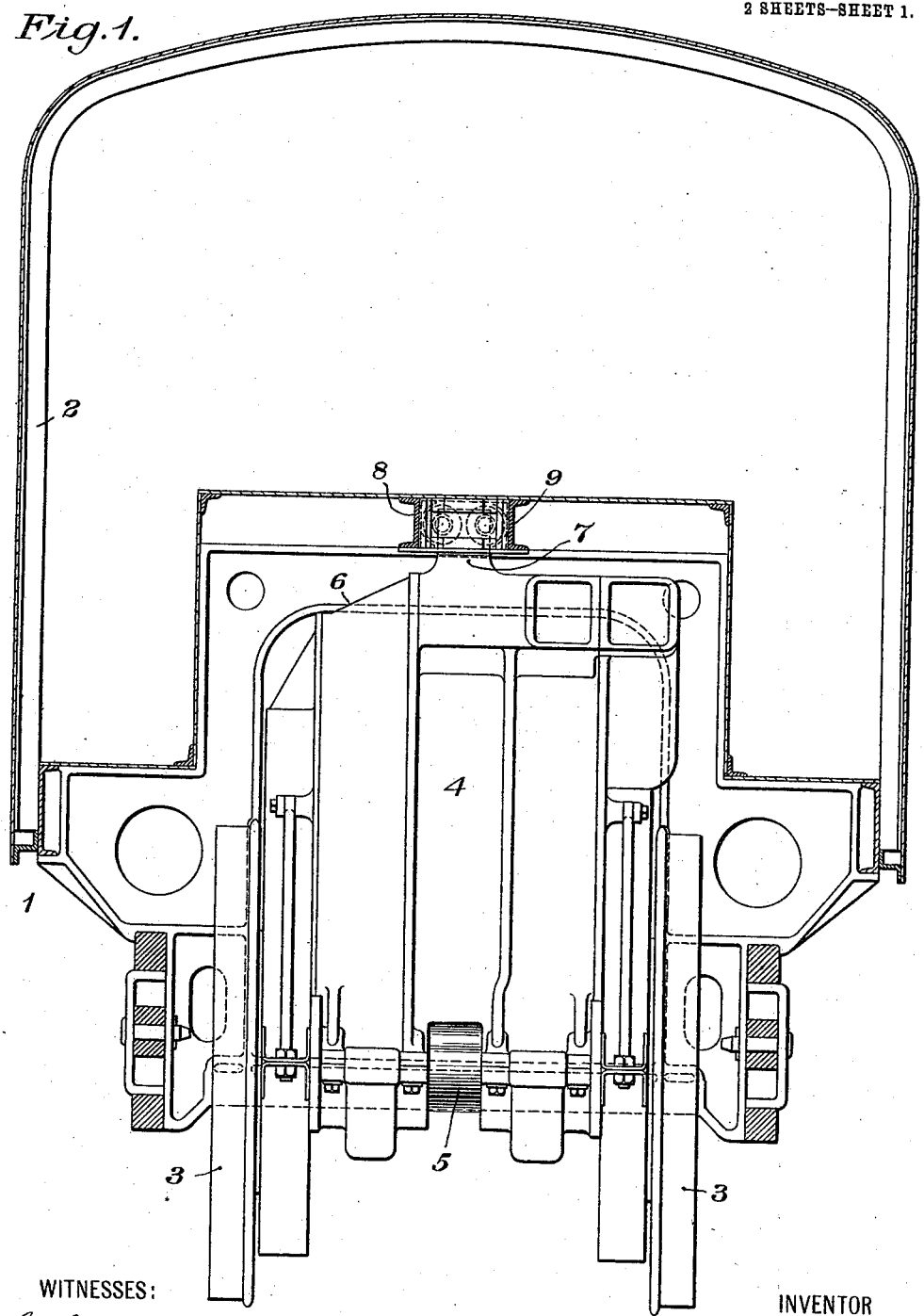

N. W. STORER.
TORQUE OPPOSING DEVICE.
APPLICATION FILED DEC. 2, 1909.

996,735.

Patented July 4, 1911.

2 SHEETS—SHEET 1.

WITNESSES:

INVENTOR

BY

ATTORNEY

N. W. STORER.
TORQUE OPPOSING DEVICE.
APPLICATION FILED DEC. 2, 1909.
996,735.
Patented July 4, 1911.
2 SHEETS—SHEET 2.
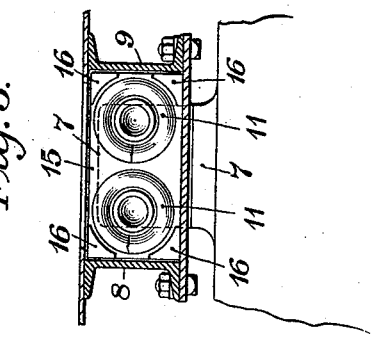
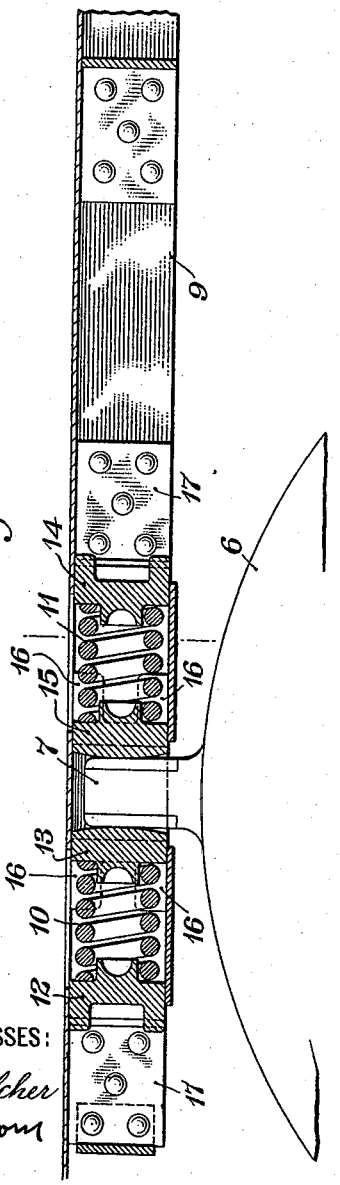
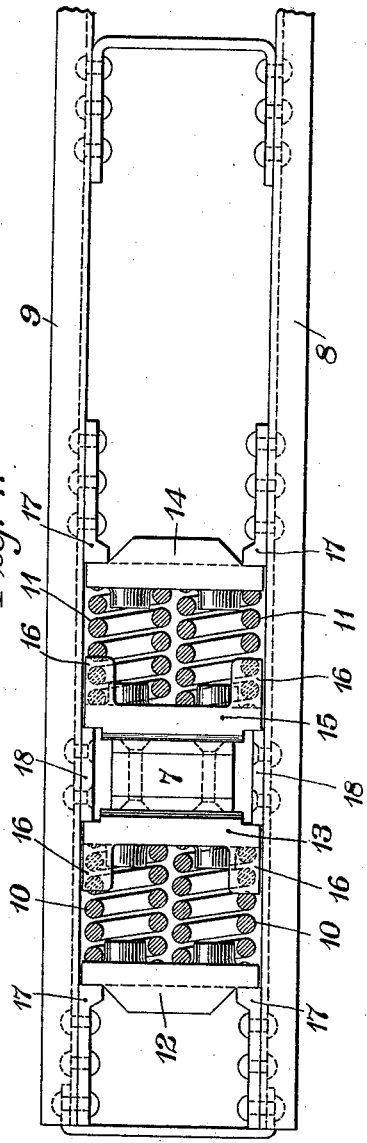
WITNESSES:
C. L. Belcher
INVENTOR
Norman W. Storer
BY
Wesley G. Carr
ATTORNEY

UNITED STATES PATENT OFFICE.

NORMAN W. STORER, OF PITTSBURG, PENNSYLVANIA, ASSIGNOR TO WESTINGHOUSE ELECTRIC AND MANUFACTURING COMPANY, A CORPORATION OF PENNSYLVANIA.

TORQUE-OPPOSING DEVICE.

996,735.  Specification of Letters Patent.  Patented July 4, 1911.

Application filed December 2, 1909. Serial No. 531,053.

*To all whom it may concern:*

Be it known that I, NORMAN W. STORER, a citizen of the United States, and a resident of Pittsburg, in the county of Allegheny and State of Pennsylvania, have invented a new and useful Improvement in Torque-Opposing Devices, of which the following is a specification.

My invention relates to means for opposing the torques exerted by motors and has special reference to devices used in connection with electric motors which are utilized for propelling locomotives or other vehicles.

The object of my invention is to provide simple and compact apparatus which shall serve, not only to oppose the torque exerted by the motor in connection with which it is used, but also to absorb the shocks and vibrations incident to the operation of electrically propelled vehicles.

When electric driving motors are mounted above the axles of a locomotive or other electric vehicle, their torques are sometimes opposed by rods which are pivotally connected to their frames and are resiliently secured to supports formed on the frame or body of the vehicle, as shown, for example, in Patent No. 937,329, granted October 19, 1909, to Westinghouse Electric & Manufacturing Company, upon an application filed by Charles A. Psilander.

According to my present invention, I provide a pair of beams, running longitudinally of the locomotive and above the motors which, when disposed as above indicated, extend upwardly into the vehicle cab for considerable distance, to support a raised platform or box covering for the motor and which, at the same time, are used to support the torque-opposing means. The motors are provided with projections which extend upwardly between the beams and are resiliently connected thereto, as hereinafter set forth. By this means, I am able to materially simplify the torque-opposing means and, at the same time, to provide a particularly advantageous vehicle frame structure.

Figure 1 of the accompanying drawings is a partially sectional elevation of an electric locomotive having motors which are equipped with torque-opposing means constructed in accordance with my invention. Fig. 2 is a longitudinal section, Fig. 3 a transverse section and Fig. 4 a plan view of the torque-opposing apparatus illustrated in outline in Fig. 1.

Referring to the drawings, an electric locomotive 1 having a cab 2 mounted on driving wheels 3 is equipped with one or more electric motors 4 which are yieldingly supported on yokes journaled on the driving axles 5. The motor frame 6 extends upwardly into the interior of the cab 2 and is provided with a projection 7. The two channel beams 8 and 9 extend longitudinally through the cab and form the sides of a long and narrow channel into which the nose projections from the vehicle motors project. The motor frame is normally held in its upright position by means of the torque-opposing device shown in Figs. 2, 3 and 4 which permits of a certain amount of rotary adjustment of the motor frame and tends to absorb the shocks and vibrations which would otherwise be transmitted from the frame to the vehicle. The absorbing apparatus comprises a plurality of helical springs 10 and 11 that are respectively interposed between the blocks 12 and 13 and the blocks 14 and 15. The blocks 13 and 15 are alike and each is provided with guide projections 16 and is adapted to slide in the channel formed by the beams 8 and 9. The blocks 12 and 14 are alike and are forced into engagement with positive stops 17, which are riveted to the beams 8 and 9, by the springs 10 and 11. The blocks 13 and 15 are forced into engagement with the nose projection 7, which extends between them, by means of the springs 10 and 11 which normally keep the nose projection in a vertical plane or in some other predetermined position.

When the electric motor is started in the one direction or the other, the motor frame tends to rotate in the opposite direction, and the shock, which would otherwise fall directly upon the vehicle frame, is absorbed by the one or the other of the two sets of springs 10 and 11. Referring to Fig. 2, and assuming that the motor frame 6 tends to rotate in a clockwise direction, it is evident that the springs 11 will be compressed and that the pressure normally exerted by the springs 10 will be relieved. In order to prevent the springs 10 from being dislocated under these conditions, the movement of the blocks 13 is limited by stops 18 that are riveted to the beams 8 and 9. When the motor is so started that the frame tends to rotate in the opposite direction, the block 11 comes into engagement with the same projections 18. Thus a slight pressure is always kept on the springs and they are consequently prevented from dislocation.

In order to minimize the wear between the engaging surfaces of the blocks 13 and 15 and the nose projections 7, the engaging surfaces of the blocks are made convex. In this way, a rolling contact is maintained as the motor frame is adjusted during the operation of the motor.

It is evident that my invention is not limited to the specific arrangement illustrated in the drawings and other adaptations may obviously be made within its scope.

I claim as my invention:

1. In an electrically propelled vehicle, the combination with a vehicle body having a pair of parallel longitudinal beams near its center and a propelling motor extending upwardly between the parallel beams, of stops secured to said beams and torque-opposing springs interposed between the nose projection and the stops.

2. In an electrically propelled vehicle, the combination with a cab having a pair of centrally located longitudinal beams spaced a short distance apart and a propelling motor having a nose projection extending upwardly between the beams, of torque-opposing means comprising blocks adjustably mounted between the beams on opposite sides of the nose projection and springs for forcing the blocks into engagement with the nose, the engaging surfaces of the blocks being convex to produce a rolling contact between the nose and the blocks.

3. In an electrically propelled vehicle, the combination with a cab having a pair of centrally located longitudinal beams and trucks, of driving motors mounted above the axles of the trucks and extending into the cab and having projections extending upwardly between the beams, and resilient torque-opposing means disposed between the beams and acting on said projections, said beams being adapted to support a platform or casing over the motors in the cab and carry torque-opposing means.

In testimony whereof, I have hereunto subscribed my name this 26th day of November, 1909.

NORMAN W. STORER.

Witnesses:
WILLIAM SCHAAKE,
B. B. HINES.

---

Copies of this patent may be obtained for five cents each, by addressing the "Commissioner of Patents, Washington, D. C."